US011988039B2

(12) United States Patent
McCloskey, Jr.

(10) Patent No.: US 11,988,039 B2
(45) Date of Patent: May 21, 2024

(54) MATERIAL SHEET FRICTIONAL SECURING ASSEMBLY

(71) Applicant: John Charles McCloskey, Jr., Bethlehem, PA (US)

(72) Inventor: John Charles McCloskey, Jr., Bethlehem, PA (US)

(*) Notice: Subject to any disclaimer, the term of this patent is extended or adjusted under 35 U.S.C. 154(b) by 86 days.

(21) Appl. No.: 17/867,555

(22) Filed: Jul. 18, 2022

(65) Prior Publication Data

US 2024/0018829 A1 Jan. 18, 2024

(51) Int. Cl.
*E06B 9/52* (2006.01)

(52) U.S. Cl.
CPC .......... *E06B 9/52* (2013.01); *E06B 2009/527* (2013.01)

(58) Field of Classification Search
CPC ............................. E06B 9/52; E06B 2009/527
USPC ....... 160/370, 371, 378, 382, 391, 392, 395, 160/403
See application file for complete search history.

(56) References Cited

U.S. PATENT DOCUMENTS 1,212,676 A 1/1917 Porter
1,758,292 A 5/1930 Meyer et al.
1,767,487 A * 6/1930 Shogren .................... E06B 9/52 160/369
2,436,277 A 2/1948 Willett
2,541,971 A 2/1951 Thies
2,567,743 A * 9/1951 Stafford .................... E06B 9/52 211/45
2,759,538 A 8/1956 Long
2,783,834 A 3/1957 Brame
2,784,781 A * 3/1957 Rhoades ................... E06B 9/52 160/397
2,837,153 A 6/1958 Brown et al.
2,897,889 A 8/1959 Gerald
3,220,469 A * 11/1965 Oehmig .................... E06B 9/52 160/395
3,255,810 A 6/1966 Rowbottam
3,464,480 A * 9/1969 Kuss ...................... A47H 13/01 160/370
4,084,360 A 4/1978 Reckson
4,237,632 A * 12/1980 Segerstad ........... G09F 15/0018 40/790
4,316,308 A * 2/1982 Chatelain ................ F24S 80/70 24/335
4,403,642 A * 9/1983 Morris .................... B44C 7/022 160/383
4,498,255 A * 2/1985 Heard ................. A47G 1/0611 40/647
4,566,236 A * 1/1986 Pound ................... F16B 5/0692 160/354

(Continued)

*Primary Examiner* — Joshua E Rodden

(57) ABSTRACT

An assembly to frictionally secure a material sheet to a surface or to cover an opening for any frame that includes a Base Piece secured to the desired area and a Clamp Arm connected to the Base Piece via a ball and joint allowing radial motion of the Clamp Arm. Using any standard flat-headed tool to apply force, the Clamp Arm can move to an open or secured position allowing repeated uninstall and re-install of a material sheet. Excess length of the Material Sheet is forced into the cavity in the Base Piece and hidden, avoiding the need for the Material Sheet to be cut to the exact smallest size to cover the area, giving the edges a straight, clean look, with the Material Sheet taut.

3 Claims, 2 Drawing Sheets

(56) References Cited

U.S. PATENT DOCUMENTS 4,662,038 A * 5/1987 Walker .................. F16B 5/0692 160/395
4,665,670 A * 5/1987 van den Burg ...... A01G 9/1415 160/354
4,702,025 A * 10/1987 Mace .................. G09F 15/0018 40/647
4,788,806 A * 12/1988 Sease ....................... B44C 7/022 160/395
4,790,037 A * 12/1988 Phillips ................... E04H 4/105 4/499
4,958,458 A * 9/1990 Hillstrom ............. A47G 1/0611 40/647
5,042,180 A * 8/1991 Horiuchi ................... G09F 1/12 40/788
5,046,546 A * 9/1991 Benedyk ................. E06B 9/521 160/371
5,301,737 A 4/1994 Martin
5,608,980 A * 3/1997 Pangerl ............... G09F 15/0018 40/793
5,711,057 A * 1/1998 Dameron ............ G09F 15/0025 24/67.11
6,088,942 A * 7/2000 Brooks ............... G09F 15/0025 160/328
6,164,364 A * 12/2000 Morris .................... E04B 9/303 160/327
6,170,793 B1 1/2001 Clarke
6,233,859 B1 * 5/2001 Kilpatrick ........... G09F 15/0018 40/796
6,263,949 B1 7/2001 Guthrie, Jr.
6,876,493 B1 * 4/2005 Lin ........................... E06B 9/40 359/461
7,861,473 B1 1/2011 Green
8,074,411 B1 * 12/2011 Anderson ............. E04F 13/005 52/273
8,156,994 B2 * 4/2012 Armstrong ................ E06B 9/52 136/251
8,763,215 B1 * 7/2014 Lin ..................... G09F 15/0025 40/658
9,453,369 B1 9/2016 Green
10,156,089 B2 * 12/2018 Bacon ....................... E06B 3/28
10,227,816 B2 * 3/2019 Kim .......................... E06B 3/30
11,371,284 B2 * 6/2022 Karolevitz ................ E06B 9/52
11,788,319 B2 * 10/2023 Zoltek ....................... F16B 2/22 24/462
2004/0168379 A1 9/2004 Chen
2010/0147471 A1 * 6/2010 Bull .......................... E06B 9/52 160/381
2014/0130993 A1 * 5/2014 Zwar ......................... E06B 9/52 160/371
2017/0261018 A1 * 9/2017 Gibb ......................... G09F 7/18

* cited by examiner

MATERIAL SHEET FRICTIONAL SECURING ASSEMBLY

TECHNICAL FIELD

The present invention relates to Fixed Construction and/or Human Necessities, and more particularly to:

E06B9/52—Operating or securing mechanisms for screening or protective devices; Screens for protection against insects, e.g. fly screens;

A47G1/1686 Picture rails; Accessories therefore, e.g. hooks or the like, specially adapted for use with picture rails;

A47B97/02 Devices for holding or supporting maps, drawings, or the like, including means for preventing rolling-up;

E06B2009/527—Mounting of screens to window or door.

The following is a tabulation of some prior art that presently appears relevant:

| Patent Number | Kind Code | U.S. Patents Issue Date | Patentee |
|---|---|---|---|
| U.S. Pat. No. 5,046,546A | B9 | 1991 Sep. 10 | Aluminum Company of America |
| U.S. Pat. No. 3,220,469A | B9 | 1965 Nov. 30 | Robert G Oehmig |
| U.S. Pat. No. 20040168379A1 | B9 | 2004 Sep. 2 | Chen Chang Than |
| U.S. Pat. No. 2,759,538A | B9 | 1956 Aug. 21 | Lester F Long |
| U.S. Pat. No. 6170793B1 | G1 | 2001 Jan. 9 | Gregory A Clarke |
| U.S. Pat. No. 1,758,292A | B9 | 1930 May 13 | Denoyer Geppert Co |

BACKGROUND

This application relates to the securing of sheets of material.

BACKGROUND—PRIOR ART

Originally, screen doors were predominantly made with a design to affix the sheet of screen material to the door frame using a long, rounded rubber string-like material, known as spline, that was used to force the screen into an indentation in the door frame surrounding the opening to be covered. Once the spline was inserted into this indentation, over top of the taut screen, around all four sides of the opening in the frame, the sheet of screen was then trimmed down to the exact smallest size possible to cover the opening making the edges look neat and symmetrical with the spline securing it at the very edges. This is exemplified by patents listed by Long and Than (U.S. Pat. No. 2,759,538A & US20040168379A1 respectively).

While the sheet of screen remains in its originally installed state, this process is adequate. However, significant problems arise once the sheet of screen is disturbed by external forces such as weather in the form of high winds or other impact types such as a child or animal running through the screening affixed to the door, or objects (i.e., furniture) impacting the screen, among other possible impact scenarios. In any of these events, when a sharp force impacts the sheet of screen it can become partially or completely dislodged. Additionally, if the screen sheet is impacted with enough force and does not immediately release from the door frame, damage to the door frame can also result. This last issue, solely, was addressed by Aluminum Company of America in their patent (U.S. Pat. No. 5,046,546A).

This scenario is not limited only to a screen door and can be broadened to include any framed structure that utilizes sheets of screen affixed to the frame and covering an opening such as a screen window, screen garage door, screened porch, etc. In all these examples, the screen is generally affixed to the frame by using spline or some other similar process wherein the sheet of screen is pulled taut then trimmed down to the exact smallest size possible to cover the opening, of which is a suffering of all three U.S. Patents listed requiring spline or a spline substitute (U.S. Pat. No. 5,046,546A, US20040168379A1, U.S. Pat. No. 2,759,538A). In any impact scenarios, once the screen sheet is dislodged, even if the screen is undamaged, it is unlikely it can be reinstalled on to the frame to be used again as it is nearly impossible to position and reaffix it in the exact same taut manner to cover the opening as in the original installation. Thus, the sheet of screen must be discarded and a new one purchased that is larger than the opening needed to be covered.

In addition to the potential damage and waste previously described, the spline retention method also requires the use of specialty tools known as a screen window spline roller and a rubber strip hook. Even with the purchase of these tools, the installation process for a new screen sheet can take a significant amount of time, especially for the novice and unskilled in the process.

Alternative design to the use of spline such as Aluminum Company of America (U.S. Pat. No. 5,046,546A) and Oehmig (U.S. Pat. No. 3,220,469A) are simply a redesign of the spline methodology using a different construct as spline and thus, as in this case, are only able to address one or two improvements over the previous spline technology. However, the screen enclosure apparatus (U.S. Pat. No. 5,046,546A) still presents the potential need for specialty tools for installation, as well as having to trim the sheet of screen to the exact smallest size that covers the opening. And Oehmig's screen frame (U.S. Pat. No. 3,220,469A) is a very complicated design requiring precision manufacturing with higher quantities of raw materials. All these examples also have inherent limitation in their design that they have no use outside of their function for securing a screen sheet to a framed window or door.

Nevertheless, all these options heretofore known suffer from several disadvantages:

(a) Difficulty in Installation. Each of these designs requires the need to remove the affected frame from its mounted location as it would be nearly impossible to install or reinstall a screen sheet to the frame while mounted. Specialty tools are almost a necessity, especially for a novice or unskilled individual. These tools can be cumbersome and, if used incorrectly, some or all the installation may need to be removed and done over.

(b) Use of Specialty Tools for Installation. As described in (a), specialty tools are nearly a necessity to install a screen sheet using a spline method. This requires that an individual spend additional money to complete this process.

(c) Lack of Reusability. Once a sheet of screen is installed using a spline or spline-substitute method, the sheet of screen is then trimmed down to the exact smallest size required to cover the opening. When trimmed, the sheet of screen is already in a taut state. If the screen sheet is subsequently partially, or completely, dislodged from the frame but otherwise undamaged, it is nearly impossible to reinstall and re-use under normal circumstances.

(d) Cause of Potential Damage. In many situations where a sheet of screen is impacted with excessive force, the spline is so rigid in nature, it will not allow the sheet of screen to be dislodged from the frame it is affixed to. In such a case, the excessive forces are then transferred from the screen sheet to the frame potentially causing significant damage to the frame as well as the screen itself.

(e) Lack of Multi-Purpose Usage. All the patents cited that attempt to solve some of the issues with affixing a sheet of screen to a frame (U.S. Pat. Nos. 5,046,546A, 3,220,469A, US20040168379A1, U.S. Pat. No. 2,759,538A) are designed and described for only this sole purpose. There are no other described uses for them or needs that they address or solve. Other than affixing a sheet of screen to a frame, these inventions are otherwise useless.

SUMMARY

In accordance with one embodiment, a "Material Sheet Frictional Securing Assembly" comprises a Base Piece which can be secured to any desired frame or surface and a Clamp Arm that are two separate parts, but connected to each other via a ball joint allowing the Clamp Arm radial motion so that it may rotate to a secured closed position applying a pressure force against the Base Piece, frictionally securing a Material Sheet in between the Base Piece and the Clamp Arm.

Advantages

Accordingly, several advantages of one or more aspects are to provide a frictional securing assembly that can secure a material sheet to a frame or area which allows simple and quick installation of said sheet and with no need for any kind of tools that are specially designed for this singular function. This assembly provides the ability for reinstallation and reuse of a material sheet should it become partially, or wholly, dislodged while also decreasing the potential of damage to both the material sheet and the attached frame or area under application of excessive forces. Additionally, the frictional securing assembly can also be utilized in various applications where it is needed to secure a material sheet on one or more of its edges either temporarily or permanently.

DRAWINGS

REFERENCE NUMERALS

Figure 1:
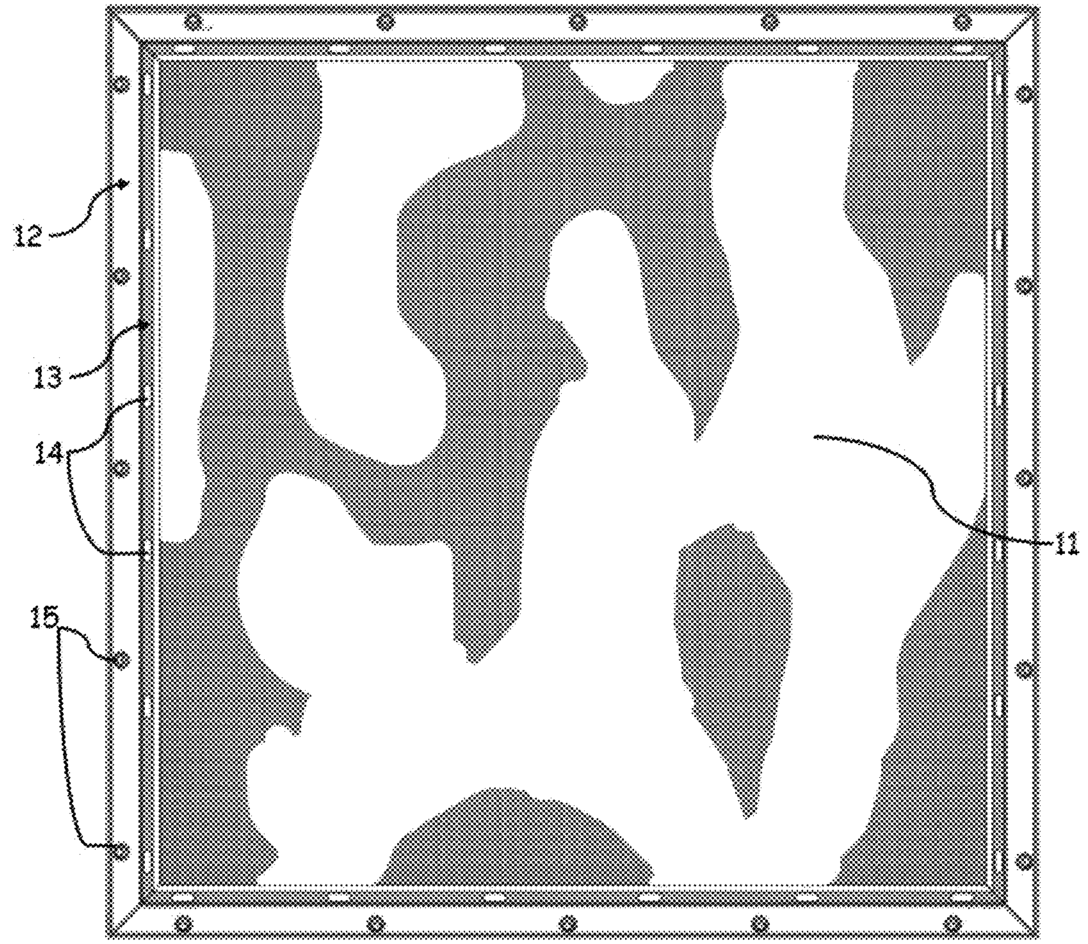
FIG. 1 is a full perspective view of one embodiment of the assembly as a four-sided frame with a material sheet secured on all four edges.

11. Material Sheet—Sheet of screening or other material to be secured.

12. Base Piece—Assembly piece that is secured to surface for which it is desired to affix the material sheet.

13. Clamp Arm—Attached to the Base Piece (12) by inserting its Clamp Ball (**17*b*) into the Clamp Joint (17*a*) on the Base Piece (12**) allowing it to swing in a radial motion from an open (up) position to a secured (down) position.

14. Lock/Unlock Hole—Openings periodically spaced along the length of the Clamp Arm where a flat-headed tool is inserted to either lock the Clamp Arm into the Base Piece (12) or unlock it.

15. Securing Screw Holes—In one embodiment where the Base Piece (12) is a stand-alone piece, the Securing Screw Holes can be used as one way to affix the Base Piece (12) to the desired platform, frame, or other surface.

16. Lock/Unlock Cavity—Open area in the middle of the Clamp Arm (13) where a flat-headed tool enters after being inserted through the Lock/Unlock Hole (14).

**17*a*. Clamp Joint—A circular opening in the Base Piece (12) for which the Clamp Ball (17*b***) is inserted.

**17*b*. Clamp Ball—The rounded left corner of the Clamp Arm (13) which is inserted into the Clamp Joint (17*a***).

18. Clamp Notch—An indentation in the Base Piece (12) allowing the Notch Post (21) on the Clamp Arm (13) to lock in place with a Material Sheet (11) lodged in between thus utilizing friction to secure the Material Sheet (11) in place between the two pieces of the assembly.

19. Lock Ridge—A ridge or protrusion that runs along the inside of the Clamp Arm (13), creating one side of the Lock/Unlock Well (16).

20. Material Cavity—An open area within the Base Piece (12) where excess Material Sheet (11) is fed into under the Clamp Arm (13) and over top of the Clamp Notch (18).

21. Notch Post—A protrusion on the end of the Clamp Arm (13) opposite the Clamp Ball (**17*b*) that fits in to the Clamp Notch (18) on the Base Piece (12**).

22. Back Wall—The area in the middle of the Base Piece (12) that connects its top and bottom sections.

23. Base Piece Top—In a sectional view of the Base Piece (12), denotes the area above the Material Cavity (20) and the Back Wall (22) of which it is connected, and contains the Clamp Joint (**17*a***).

24. Base Piece Middle—In a sectional view of the Base Piece (12), denotes the area below the Base Piece Top (23) and above the Base Piece Bottom (25), comprised of the Back Wall (22) and the Material Cavity (20).

25. Base Piece Bottom—In a sectional view of the Base Piece (12), denotes the area below the Material Cavity (20) and the Back Wall (22) of which it is connected, and contains the Clamp Notch (18).

26. Clamp Arm Left—In a sectional view of the Clamp Arm (13), denotes the area of the Clamp Arm (13) to the left of the Lock/Unlock Cavity (16) and the Clamp Arm Top (27), of which it is connected, and contains the Clamp Ball (**17*b***).

27. Clamp Arm Top—In a sectional view of the Clamp Arm (13), denotes the area above the Lock/Unlock Cavity (16) and to the left of the Clamp Arm Right (28) of which it is connected.
28. Clamp Arm Right—In a sectional view of the Clamp Arm (13), denotes the area of the Clamp Arm (13) to the right of the Lock/Unlock Cavity (16) and the Clamp Arm Top (27), of which it is connected, and contains the Notch Post (21).

DETAILED DESCRIPTION

Description

A "Material Sheet Frictional Securing Assembly", hereinafter referred to as "the assembly", will work with any size or shape opening, or area, that needs to be covered with a secured sheet of material. The Assembly can be made in variable size lengths that can be mounted in-line alongside each other, or at any required angles, to extend the coverage area as long and as wide as needed, and in any geometric shape desired.

Figure 4:
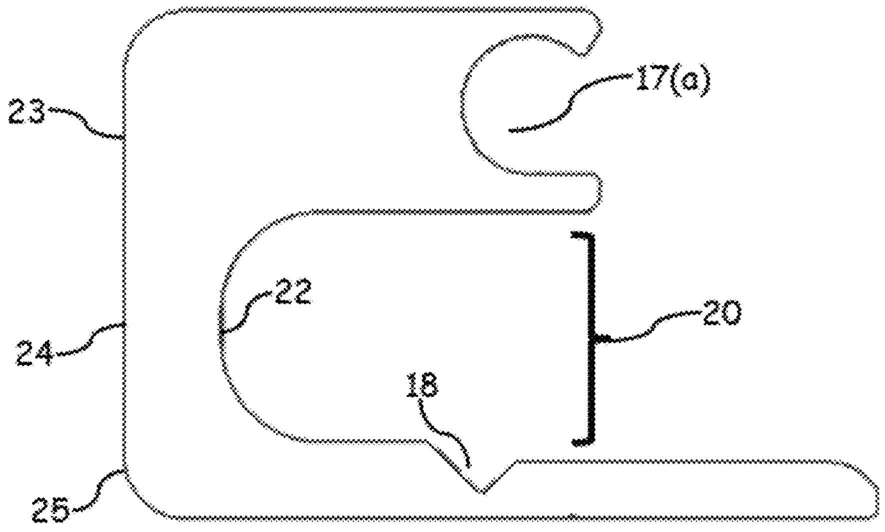
FIG. 4 is a sectional isolation view of one embodiment of the Base Piece.
Figure 5:
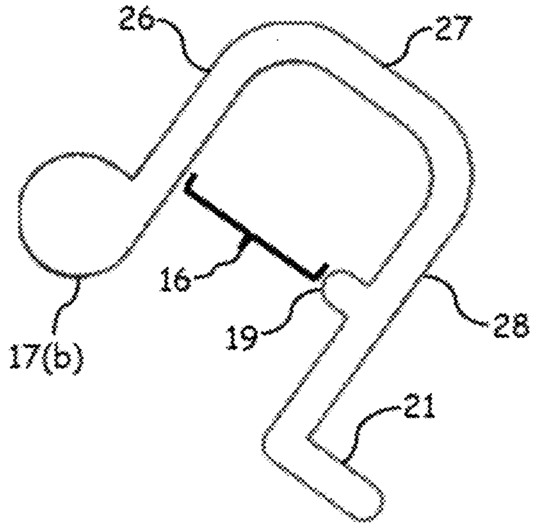
FIG. 5 is a sectional isolation view of one embodiment of the Clamp Arm.

In one embodiment, the assembly is comprised of two distinct pieces, as shown in FIGS. 4 and 5. FIG. 1 shows a simple square shape design of the assembly securing a Material Sheet (11) on all four sides. The Base Pieces (12) are fastened to a frame or surface in some manner such as being screwed down using the Securing Screw Holes (15), or glued, or any other method that is secure.

Figure 2:
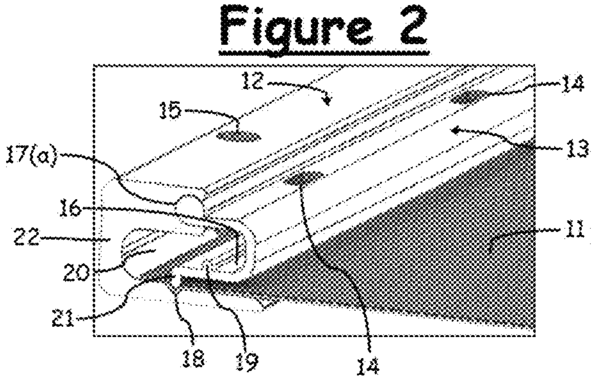
FIG. 2 is a partly sectional perspective view of one embodiment of a portion of the assembly showing the manner of attaching a material sheet with the Clamp Arm in the down (secured) position.
Figure 3:
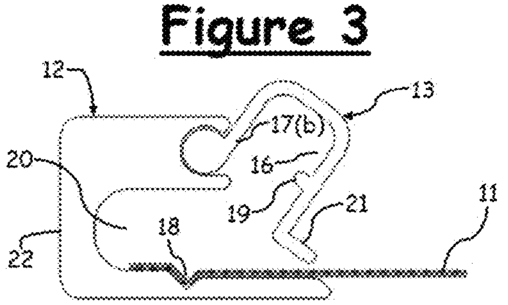
FIG. 3 is a sectional view of one embodiment of the assembly depicting the up (open) state when a material sheet is inserted and prior to secure closure.

The Base Piece (12) can be made of either a strong, non-corrosive metal such as aluminum or a sturdy inflexible plastic. From a sectional perspective, as depicted in FIGS. 2, 3, and 4, the Base Piece (12) resembles the letter "C" with the bottom of the piece flat and elongated and having a notch in it, called the Clamp Notch (18). The top is considerably thicker than the bottom with a circular opening, or joint, at the right end called the Clamp Joint (17*a*). In the middle of the Base Piece (12) is an open area known as the Material Cavity (20) where the ends of the secured Material Sheet (11) are stored as well as the Back Wall (22) which connects the top to the bottom.

The Clamp Arm (13) can be made from a sturdy yet flexible plastic. The Clamp Arm (13) is connected to the Base Piece (12) by inserting the Clamp Ball (17*b*) into the Clamp Joint (17*a*), allowing the Clamp Arm (13) radial motion. From a sectional perspective, as depicted in FIGS. 2, 3, and 5, the Clamp Arm (13) resembles a lowercase letter "n". The bottom of the left leg of the "n" shape is a rounded ball shape called the Clamp Ball (17*b*) that fits in to the Clamp Joint (17*a*) on the Base Piece (12). Also, on the left leg of the "n" shape, periodically spaced apart are holes known as Lock/Unlock Holes (14). The bottom of the right leg of the "n" shape has a protrusion at a 90-degree angle called the Notch Post (21) that extends along the entire length of the Clamp Arm (13) and fits in to the Clamp Notch (18) on the Base Piece (12). On the inside of the right leg of the "n" shape is another protrusion known as the Lock Ridge (19) which can run along the entire inner length of the Clamp Arm (13). In the middle of the Clamp Arm (13) is an open area known as the Lock/Unlock Cavity (16).

Operation:

When the Clamp Arm (13) is lifted to the up (open) position it creates an opening where a sheet of material can be inserted and fed under the Clamp Arm (13), over top of the Clamp Notch (18), and back into the Material Cavity (20). By inserting any standard flat-headed tool into one of the Lock/Unlock Holes (14), through the Lock/Unlock Cavity (16), and resting it against the Lock Ridge (19), one can apply force pushing the Clamp Arm (13) in a radial motion towards the Base Piece (12). Once the Clamp Arm (13) rotates far enough, the Notch Post (21) begins to drag along the Material Sheet (11) and drags it further into the Material Cavity (20), then snaps into the Clamp Notch (18), thus frictionally securing the Material Sheet (11) in between the Notch Post (21) and the Clamp Notch (18) in a taut state. One then removes the flat-headed tool and moves it to the next Securing Screw Hole (15) in line and repetitively performs the same process described above until the entire length of the Notch Post (21) is fully inserted into the Clamp Notch (18) and the Clamp Arm (13) fully resides in the down (secured) position along the entire length of the Base Piece (12).

To disengage the assembly, insert the flat-headed tool into one of the Lock/Unlock Holes (14), through the Lock/Unlock Cavity (16), and apply radial force in the opposite direction of the Lock Ridge (19) until the Notch Post (21) snaps out of the Clamp Notch (18). One then removes the flat-headed tool and moves it to the next Securing Screw Hole (15) in line and repetitively performs the same process described above until the entire length of the Notch Post (21) is fully removed from the Clamp Notch (18) along the entire length of the Base Piece (12) and the Clamp Arm (13) can move in a radial direction away from the Base Piece (12). This will create an open space between the Base Piece (12) and the Clamp Arm (13) to allow for insertion or removal of a sheet of material.

Alternative Embodiments

In alternative embodiments, the design elements of the Base Piece (12) can be incorporated directly into the construction of a manufactured frame such as a screened window frame or door frame or easel, or a surface such as a table or wall, and used with a Clamp Arm (13) with the same design. The functional operation would remain the same.

Additionally, alternative materials can be used in the manufacture of both the Base Piece (12) and the Clamp Arm (13) to account for specific situational needs including, but not limited to, strength, flexibility, and to withstand environmental factors (i.e., weather).

Advantages:

1.) Simplifies the process of installing, re-installing, or removing material sheets (11) on to or from a frame, or surface.

2.) Simplistic in its design:

a. Requiring only two parts that can be manufactured as a stand-alone product or integrated into the design of another product.

b. Requiring only a standard screwdriver or other flat headed tool with no specialized features to install, remove, and adjust material sheet (11).

3.) Allows the ability:

a. To hold a material sheet (11) in place in a secure and taut state.

b. To release a material sheet (11) when it experiences excessive forces and/or pressure applied to it from any direction, in effect relieving these forces and/or pressures and avoiding damages to both the material sheet (11) as well as the frame or surface to which it is attached.

c. To install a material sheet (11) without the need to cut or trim it to the exact smallest measurable size, while in a taut state, of the area it is being used to cover.

d. To re-use and re-install an otherwise undamaged material sheet (11) that has become dislodged from the assembly, thus avoiding unnecessary waste.

4.) Is compact, of low profile, and aesthetically pleasing.

CONCLUSION

Accordingly, the reader will see that the various embodiments of the assembly can be used to secure a material sheet (11) in a taut state easily and conveniently and can be removed just as easily and without damage to the material sheet (11). The Assembly eliminates the need for any specially designed tools, requiring only a standard screwdriver or other flat-headed tool for installation, removal, or adjustment of a material sheet (11). Its simplicity makes any material sheet (11) adjustment an easy and quick process saving the user time. The material sheet (11) does not, and should not, be cut or trimmed to the exact smallest size to fit the opening or surface, with the excess material being hidden away inside the Material Cavity (20) of the assembly giving it a clean, symmetrical look. Should the material sheet (11) be dislodged by the exertion of some excessive force, it can be re-inserted and re-used, thus eliminating unnecessary waste. Finally, the design's simplicity makes it simpler to manufacture as a stand-alone product, or by integrating it into the manufacture of a larger frame or surface assembly where its low profile allows for an aesthetically pleasing finished product.

Although the description above contains many specificities, these should not be construed as limiting the scope of the embodiments but merely providing illustrations of some of several embodiments. Thus, the scope of the embodiment should be determined by the appended claims and their legal equivalents, rather than by the examples given.

What is claimed is:

1. A frictional securing assembly for holding a sheet of material on one or more of its edges comprising:

a. A base piece of predetermined length with a bottom, middle area, and top where the bottom contains a clamp notch, the middle area is comprised of a back wall that connects the top and bottom and an open space or material cavity, and the top has a clamp joint;

b. A clamp arm of predetermined length with a left leg, top side, and right leg where the left leg begins at a bottom of the left leg with a clamp ball, and the right leg has a notch post at a bottom of the right leg which is perpendicular to the right leg protruding out in a direction pointing away from the left leg; and whereby when said base piece is secured to a frame or surface and said clamp arm is attached to said base piece by inserting said clamp ball into said clamp joint, then by applying a radial force to said clamp arm in a direction opposite said base piece to an up and open position allowing insertion of a material sheet into said material cavity, then by applying a radial force to said clamp arm in a direction of said base piece, said clamp arm engages with said material sheet, dragging it further in to said material cavity, then engaging said notch post into said clamp notch on said base piece frictionally securing said material sheet between said base piece and said clamp arm.

2. The frictional securing assembly as claimed in claim 1, wherein having a fully engaged said base piece and said clamp arm frictionally securing said material sheet is configured to be disengaged by applying a radial force to said clamp arm in the direction opposite said base piece, disengaging said notch post from said clamp notch on said base piece, where said clamp arm then disengages from said material sheet, thus releasing a frictional force upon said material sheet, allowing removal of said material sheet from said material cavity.

3. The frictional securing assembly as claimed in claim 1, wherein having a fully engaged said base piece and said clamp arm frictionally securing said material sheet will allow said material sheet to become dislodged, by overcoming a frictional force applied to said material sheet by said base piece and said clamp arm when exposed to an excessive external force which exceeds said frictional force, avoiding transfer of said excessive external force to said frame or surface, thus minimizing or completely eliminating damage to said frame or surface.

* * * * *